US009177599B1

(12) United States Patent
Camalig et al.

(10) Patent No.: US 9,177,599 B1
(45) Date of Patent: Nov. 3, 2015

(54) NON-CONTACT FLY HEIGHT CALIBRATION AND COMPENSATION

(71) Applicant: SEAGATE TECHNOLOGY LLC, Cupertino, CA (US)

(72) Inventors: Clifford Jayson Bringas Camalig, Singapore (SG); ChengYi Guo, Singapore (SG); Mui Chong Chai, Singapore (SG); Victor Chew Weng Khin, Singapore (SG); Lim TeckKhoon, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/062,549

(22) Filed: Oct. 24, 2013

(51) Int. Cl.
G11B 5/60 (2006.01)
G11B 21/21 (2006.01)

(52) U.S. Cl.
CPC .............. *G11B 21/21* (2013.01); *G11B 5/6011* (2013.01)

(58) Field of Classification Search
None
See application file for complete search history.

(56) References Cited

U.S. PATENT DOCUMENTS

| 6,930,844 | B2 | 8/2005 | Yeh et al. | |
| 7,468,856 | B2 | 12/2008 | Fitzpatrick et al. | |
| 7,679,857 | B2 | 3/2010 | Zhu et al. | |
| 7,773,336 | B2 | 8/2010 | Che et al. | |
| 7,948,704 | B2 * | 5/2011 | Ellis | 360/75 |
| 7,961,420 | B2 | 6/2011 | Park | |
| 8,169,734 | B2 | 5/2012 | Tsunoda et al. | |
| 2009/0141390 | A1 * | 6/2009 | Oyamada et al. | 360/75 |
| 2009/0153996 | A1 | 6/2009 | Ellis | |
| 2010/0033860 | A1 | 2/2010 | Tomita | |
| 2010/0208387 | A1 | 8/2010 | Ehrlich | |
| 2011/0211276 | A1 * | 9/2011 | Tsunoda et al. | 360/75 |
| 2012/0056612 | A1 | 3/2012 | Mathew et al. | |
| 2012/0229928 | A1 * | 9/2012 | Sakai | 360/31 |
| 2013/0250446 | A1 * | 9/2013 | Zeng et al. | 360/75 |

OTHER PUBLICATIONS

Boettcher et al., "Dynamic Modeling of the Resistance Heater Element in Thermal Flying Height Control Sliders," *Asia-Pacific Magnetic Recording Conference*, Nov. 10-12, 2010, Singapore.
Boettcher et al., "Servo Signal Processing for Flying Height Control in Hard Disk Drives," *Microsyst Technol*, Published online Jan. 7, 2011, 17:937-944.
Dick Martin, "Summary of Harmonic Sensor K Data", Jul. 13, 2005, 16 pages.

* cited by examiner

*Primary Examiner* — Wayne Young
*Assistant Examiner* — Brian Butcher
(74) *Attorney, Agent, or Firm* — Mueting, Raasch & Gebhardt, P.A.

(57) ABSTRACT

Calibration and calculation of thermal clearance compensation of a head in a storage device without causing contact between the head and a storage medium. The thermal clearance compensation may be configured to compensate for any changing fly height of the head of the storage device during different temperature conditions based on high and low temperature signal data.

18 Claims, 9 Drawing Sheets

Fig. 9

| HGA STATUS N Rows | | MEAN | | | DELTAA | DELTAC | DELTA IMPROVEMENT |
|---|---|---|---|---|---|---|---|
| | | BER at HOT | BER at COLD | BER at COLD with TCC | | | |
| | | 2 | 14 | 15 | 14-2 | 15-2 | DELTAC - DELTAA |
| A | NC Process 620 | -2.87 | -2.79 | -2.82 | 0.08 | 0.05 | -0.03 |
| A | C Process 630 | -2.87 | -2.76 | -2.81 | 0.11 | 0.06 | -0.05 |
| | Difference | 0.01 | 0.03 | 0.01 | 0.03 | 0.01 | -0.02 |
| B | NC Process 681 | -2.69 | -2.47 | -2.67 | 0.23 | 0.02 | -0.20 |
| B | C Process 682 | -2.88 | -2.67 | -2.85 | 0.22 | 0.04 | -0.18 |
| | Difference | -0.19 | -0.19 | -0.17 | 0.00 | 0.02 | 0.02 |

NON-CONTACT FLY HEIGHT CALIBRATION AND COMPENSATION

SUMMARY

One exemplary device (e.g., a data device for use in two-dimensional magnetic recording systems, shingled magnetic recording systems, bit-patterned media systems, heat-assisted magnetic recording systems, thermally assisted magnetic recording systems, energy assisted magnetic recording, etc.) may include a storage medium and a processor operably coupled to the storage medium.

One exemplary system may include a computing apparatus configured to be coupled to one or more storage devices. Each storage device may include a storage medium and a head configured to write and read data from the storage medium. The computing apparatus may be configured to write a selected pattern to the storage medium using the head of at least one storage device, read the selected pattern from the storage medium using the head during a high temperature condition resulting in high temperature signal data, read the selected pattern from the storage medium using the head during a low temperature condition resulting in low temperature signal data, and calculate thermal clearance compensation for the head based on the high and low temperature signal data. The thermal clearance compensation may be configured to compensate for fly height change of the head of the storage device during different temperature conditions.

One exemplary method may include providing a storage device comprising a storage medium and a head configured to write and read data from the storage medium, writing a selected pattern to the storage medium using the head, reading the selected pattern from the storage medium using the head during a high temperature condition resulting in high temperature signal data, reading the selected pattern from the storage medium using the head during a low temperature condition resulting in low temperature signal data, and calculating thermal clearance compensation for the head based on the high and low temperature signal data. The thermal clearance compensation may be configured to compensate for fly height changes of the head of the storage device during different temperature conditions.

One exemplary storage device may include a storage medium and a head configured to write and read data from the storage medium and a processor operably coupled to the head and configured to compensate for fly height change during different temperature conditions based on thermal clearance compensation calculated without contacting the head to the storage medium.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

FIG. 9 is chart comparing exemplary non-contact thermal clearance calibration with contact thermal clearance calibration.

DETAILED DESCRIPTION

Figure 1:
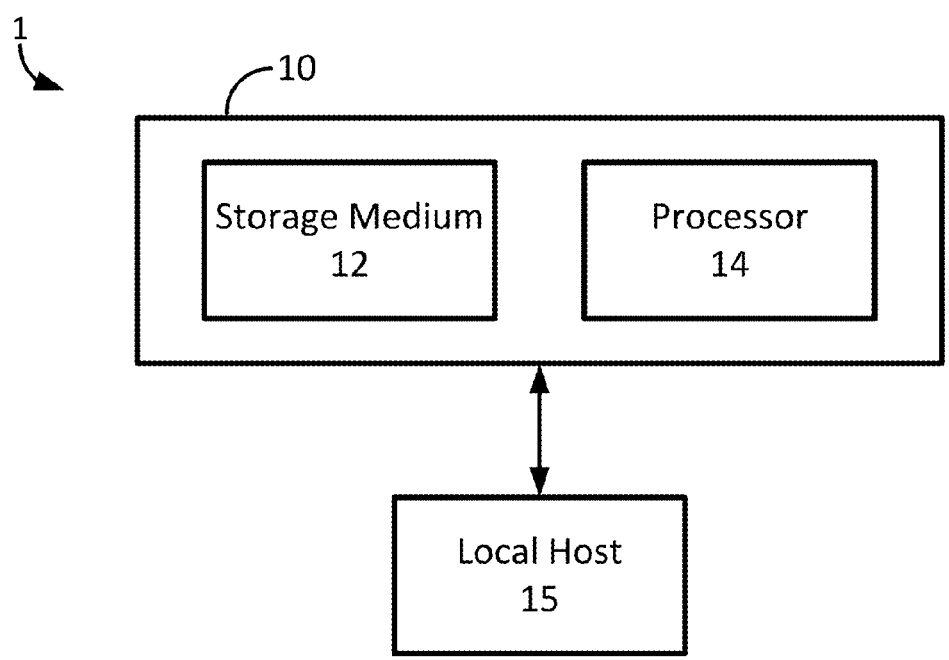
FIG. 1 is block diagram including an exemplary system for use in testing and compensating for the fly height of a head in a storage device.

The disclosure herein relates to calibrating and compensating for fly height of a head in a storage device.

The spacing between heads and storage media of storage devices (e.g., hard drives, etc.), which may be referred to as "fly height," may change due to temperature. Storage devices may employ, or utilize, various schemes or processes to compensate for fly height variance, or variation, due to temperature. For example, a storage device may be calibrated (e.g., during manufacture, prior to shipment for sale, etc.). One step in calibrating fly height compensation may be determination of contact, or touchdown, of a head, which is when a head (e.g., a read/write element of a head) makes actual contact (e.g., touches, scrapes, etc.) with a storage medium (e.g., disk surface).

In one calibration process or method, a head is moved (e.g., by applying a power to a heater) through various steps, or levels, until a portion of the head (e.g., read/write element) contacts the storage medium, thereby providing a contact, or touchdown, power of the heater at ambient temperatures. Global fixed slope coefficients (e.g., global fixed slope coefficients may be determined during testing, or "on bench," on a few samples drives using a scope, which may then be used for population drives) may be used to convert the amount of power to spacing change, which can then be used to calculate a thermal clearance slope coefficients for the drive. During operation, a storage device can optimize the fly height of a head based on temperature using the thermal clearance slope without causing contacts, or touchdowns, of the head.

Calibration using contact at two or more temperatures may be time consuming since very small adjustments may be made to the head to avoid hard or deep contact of the head with storage medium. Additionally, contact, or touchdown, (e.g., burnishing) of the head to the storage medium may cause damage (e.g., media wearing, burnishes, degradations, particles and lube build up on head, etc.) to the storage medium and/or heads, which may result in a faulty storage device, etc. Still further, contact of the head to the storage medium may cause contamination of the head and/or storage medium.

The exemplary systems, devices, and methods described herein provide non-contact thermal clearance compensation, or calibration, for a head (e.g., to compensate for the fly height between the head and the storage medium over a range of temperatures). In other words, no contact, or touchdown, between the head and the storage medium occurs when testing, calibrating, and calculating the thermal clearance compensation described herein. Additionally, it may be described that at least some space, or spacing, may exist between the head and the storage medium when testing, calibrating, and calculating the thermal clearance compensation described herein. For example, the exemplary systems, devices, and methods described herein may measure the harmonic amplitude (e.g., using a harmonic sensor controller) at two or more difference temperatures, covert the harmonic amplitude change to fly height, or spacing, (e.g., in angstroms, using the Wallace Equation, etc.), and calculate, or generate, thermal clearance slope coefficients for the drive.

An exemplary device 10 (e.g., data device) that can be used in the embodiments described herein is depicted in FIG. 1. The exemplary device 10 may be operably coupled to a local host 15 (e.g., a testing system, a personal computer system, a laptop, a server system, a cloud storage controller, etc.), e.g., for transferring data therebetween, as shown in FIG. 1. For example, the local host 15 may request data from or send data to the device 10 and the device 10 may provide such requested data to the local host 15 or may write such sent data to the device 10. In at least one embodiment, the local host 15 is a computer (such as, e.g., a personal computer, server, etc.). The device 10 includes a storage medium 12, and a processor, or processing apparatus, 14 that are operably coupled (e.g., electrically coupled to transmit data therebetween) to each other. The methods, devices, and systems disclosed herein may be generally described in the context of exemplary device 10 and/or exemplary system 1 including exemplary device 10, but that should in no way be taken as limiting the scope of the present disclosure. Generally, a device 10 may be any device and/or apparatus in which data may be written to the storage medium 12 and then read back from the storage medium 12, and a system 1 may include any device 10, local host 15, and/or any other apparatus needed to execute the exemplary methods and/or processes described herein. The storage medium 12 can include, but is not necessarily limited to, hard magnetic discs, magnetic tapes, optical discs, integrated circuits, volatile memory, nonvolatile memory, etc.

The processor 14 and/or local host 15 may include various circuitry, logic, memory, etc. for use in compensating for any fly height changes of the head(s) of the storage medium 12 due to thermal expansion and/or temperatures changes, determining, or calculating, thermal clearance compensation data (e.g. slopes, coefficients, functions, etc.), reading and writing data from the storage medium 12, etc. For example, the processor 14 and/or local host 15 may include one or more circuit components such as integrated circuits, processors, etc. that may be configured to interface with the storage medium 12 to control the fly height of the heads of a storage device using, e.g., a heater, or heater apparatus. Further, the processor 14 may include a harmonic sensor controller configured to measure harmonic amplitude and covert the amplitude to fly height, or spacing, (e.g., in angstroms, using the Wallace Equation).

Figure 2:
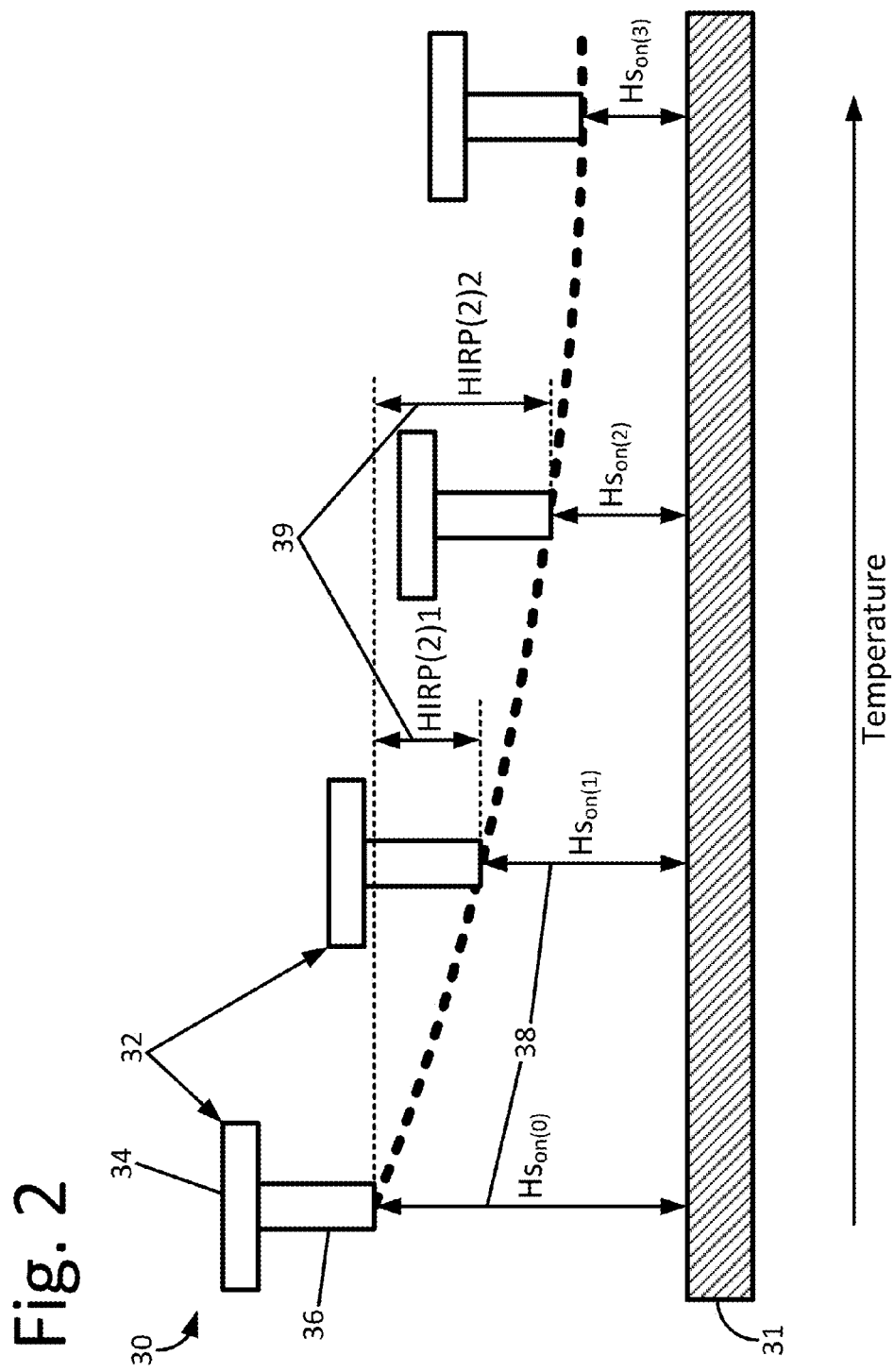
FIG. 2 is a conceptual diagram depicting the fly height of an exemplary head reading data from a storage medium as temperature increases.

A conceptual diagram 30 depicting fly height 38 of an exemplary head 32 reading data from storage media 31 as temperature increases is shown in FIG. 2. The diagrammatic head 32 includes a slider 34 and a protrusion 36 (e.g., used to write and/or read signals from the media 31). The fly height, $Hs_{on(n)}$, 38 extends between the protrusion 36 and the storage media 31. As shown, the fly height 38 decreases as temperature increases (e.g., temperature increases from left to right).

The fly height change, HIRP(2)n, 39 may be measured using a harmonic sensor controller (e.g., a portion or part of the processor apparatus 14) and the $3^{rd}$ harmonic amplitude as temperature changes may be determined. A Wallace equation may be used to convert the amplitude change into a fly height change 39 as follows in Equation (1):

$$HIRP(2)n = (\lambda/2\pi)\ln(Hs_{on(n)}/Hs_{on(0)}) FH \text{ spacing change} \quad (1)$$

The first $3^{rd}$ harmonic amplitude measurement may be used as the reference in the Wallace equation as $Hs_{on(n)}$, to calculate the fly height, or spacing, change 39 as temperature increases. Such fly height change due to temperature increase may be used to provide thermal clearance compensation (e.g., slopes, functions, coefficients, etc.) used to compensate for any fly height change of a head due to temperature. Thermal clearance compensation may be defined as any function or part thereof such as slope or coefficient that may be used to calculate a compensation value for fly height change due to temperature. The thermal clearance compensation may be described as varying (e.g., incremented, decrementing, linear, exponential, etc.) as temperature increases or decreases.

Figure 3:
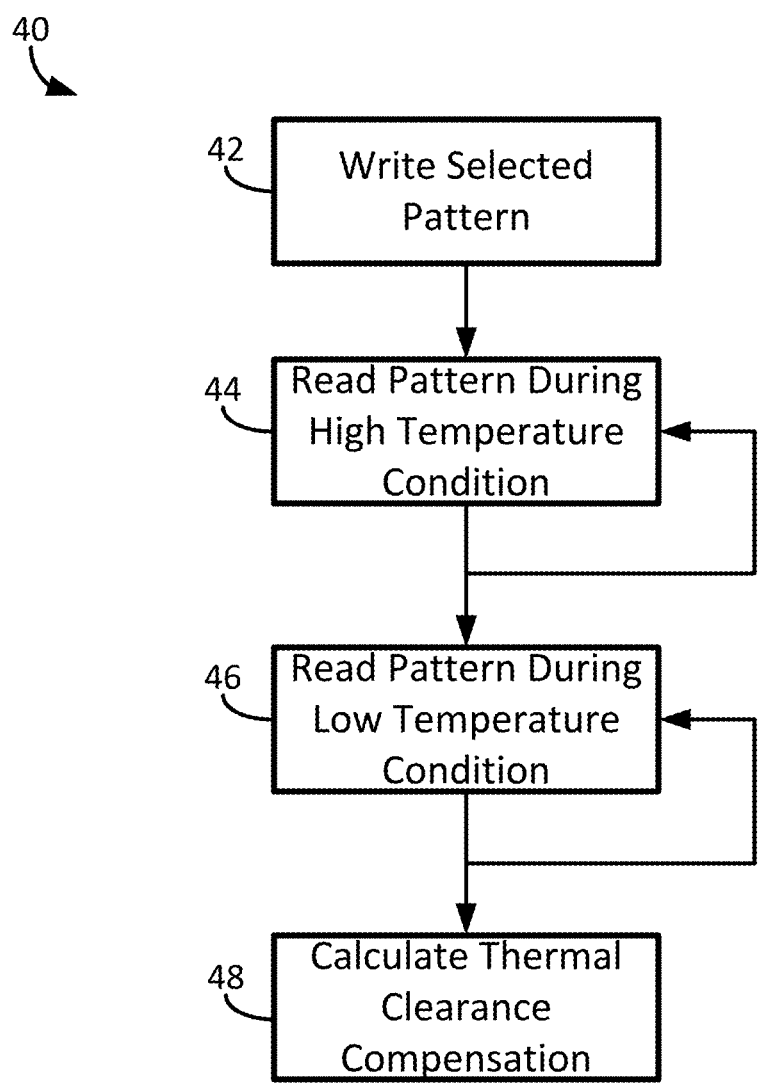
FIG. 3 is a flow diagram of exemplary method of determining a thermal clearance compensation for a storage device.

A method 40 of determining a thermal clearance compensation for a storage device is depicted in FIG. 3. The method 40 may first write a selected pattern 42 to the storage medium (e.g., one head may write to single platter, multiple heads may write to multiple platters, etc.). The selected pattern 42 may be a pre-selected signal or data pattern selected to test bit error rate of a storage medium. For example, a specific 2T frequency pattern may be written to the storage medium (e.g., 2T=2/F, where F is the tuned channel frequency by zone, 2T pattern is a fixed single tone bit pattern that will be written on the disc to, e.g., provide a flat amplitude pattern for the fly height change sensitivity measurements described herein).

The temperature of the storage device may be increased to selected high temperature value to provide a high temperature condition and the pattern may be read 44 from the storage medium at least once over a time period to provide signal data at the high temperature condition (referred to as "high temperature signal data"). For example, the high temperature condition may be about 48 degrees Celsius. In other embodiments, the high temperature condition may be greater than or equal to about 35 degrees Celsius, about 40 degrees Celsius, about 45 degrees Celsius, about 50 degrees Celsius, etc. and/or less than or equal to about 45 degrees Celsius, about 50 degrees Celsius, about 55 degrees Celsius, about 60 degrees Celsius, etc. The pattern is read 44 by the method 40 without contacting the head to the storage medium, and thus, the high temperature signal data may be obtained without contacting or burnishing the head to the storage medium.

Subsequently, the temperature of the storage device may be decreased to selected low temperature value to provide a low temperature condition and the pattern may be read 46 from the storage medium at least once over a time period to provide signal data at the low temperature condition (referred to as "low temperature signal data"). For example, the low temperature condition may be about 25 degrees Celsius. In other embodiments, the high temperature condition may be greater than or equal to about 15 degrees Celsius, about 20 degrees Celsius, about 25 degrees Celsius, about 30 degrees Celsius, etc. and/or less than or equal to about 30 degrees Celsius, about 35 degrees Celsius, about 40 degrees Celsius, etc. The pattern is read 46 by the method 40 without contacting the head to the storage medium, and thus, the low temperature signal data may be obtained without contacting or burnishing the head to the storage medium.

The exemplary method 40 may use only one pre-written calibration track written to the storage medium in process 42 for both temperature states while previous contact methods and/or processes may utilize different calibration tracks for each temperature condition.

Each "read" in processes 44, 46 may include multiple revolutions and senses of the pattern (e.g., about 20 senses, about 30 senses, about 40 senses, etc.), and each of the senses may be averaged to provide the signal data or "read pattern." For example, it may be described that the pattern may be read 44, 46 for a selected number of reads over a selected time period. The selected number of reads may be between about 25 reads to about 500 reads. For example, the selected number of reads may be greater than or equal to about 25 reads, about 40 reads, about 50 reads, about 60 reads, about 70 reads, about 80 reads, about 90 reads, about 100 reads, about 125 reads, about 150 reads, about 200 reads, about 250 reads, etc. and/or less than or equal to about 500 reads, about 400 reads, about 300 reads, about 250 reads, about 200 reads, about 175 reads, about 150 reads, about 125 reads, about 100 reads, about 90 reads, about 75 reads, about 50 reads, etc. In at least one embodiment, the selected number of reads is 90.

Additionally, the selected number of reads may be described based on a rate. The pattern may be read 44, 46 between about 1 time per minute to about 100 times per minute. For example, the pattern may be read 44, 46 greater than or equal to about 1 time per minute, about 2 times per minute, about 3 times per minute, about 5 times per minute, about 10 times per minute, about 15 times per minute, about 20 times per minute, about 30 times per minute, about 40 times per minute, about 50 times per minute, about 60 times per minute, etc. and/or less than or equal to about 100 times per minute, about 90 times per minute, about 80 times per minute, about 70 times per minute, about 60 times per minute, about 50 times per minute, about 40 times per minute, about 30 times per minute, about 25 times per minute, about 20 times per minute, about 15 times per minute, etc.

As described herein, the pattern may be read 44, 46 from the storage medium to provide signal data (e.g., high temperature signal data, low temperature signal data, etc.). For example, the signal data may be averaged for each temperate condition and then used to calculate thermal clearance compensation and/or one or more values thereof (e.g., functions, slopes, coefficients, etc.) to compensate for any fly height variation, or change, of the head due to temperature change.

For instance, as shown in FIG. 3, after the pattern has been read during both the high temperature condition 44 and the low temperature condition 46, the method 40 may then use high and low temperature signal data to calculate thermal clearance compensation 48. As described herein, the thermal clearance compensation may be defined as any function or part thereof such as slope or coefficient that may be used to calculate a compensation value for fly height change due to temperature. In its simplest form, the thermal clearance compensation may be a slope. Thus, thermal clearance compensation is generated, or calculated, for each drive being calibrated without using any contacting the storage medium with the head and/or using test data, such as fixed global coefficients, etc. gathered using a few sample drives.

In other forms, the thermal clearance compensation may be a linear decaying function including a maximum fly height compensation value and a decay value. The maximum fly height compensation value may be the maximum fly height compensation to use for a particular head during a low temperature condition. The decay value may be a rate of decay off the maximum fly height compensation from the low temperature condition and the high temperature condition Further, in other forms, the thermal clearance compensation may be a decaying polynomial, or exponential, function.

As described herein, the fly height may be calculated using the Wallace Equation. More specifically, fly height may be calculated using $HIRP(2)=(\lambda/2\pi)\ln(HSC1/HSC0)$ & $\lambda(2T$ wavelength$)=($radius$\times 2\pi \times $rpm$\times 4)/(60\times f)$, GammaH may be solved using GammaH$=c1+c2(ntr/1k)+c3(ntr/1k)^2$, and HIRP(2) may be gammatized using $HIRP(2)=HIRP(2)\times$ GammaH, wherein HSC0=3rd harmonic amplitude from ramp, HSC1=3rd harmonic amplitude read back for every read, and HIRP2=spacing changed calculated using Wallace Equation from HSC1 and HSC0 amplitude change.

Figure 4:
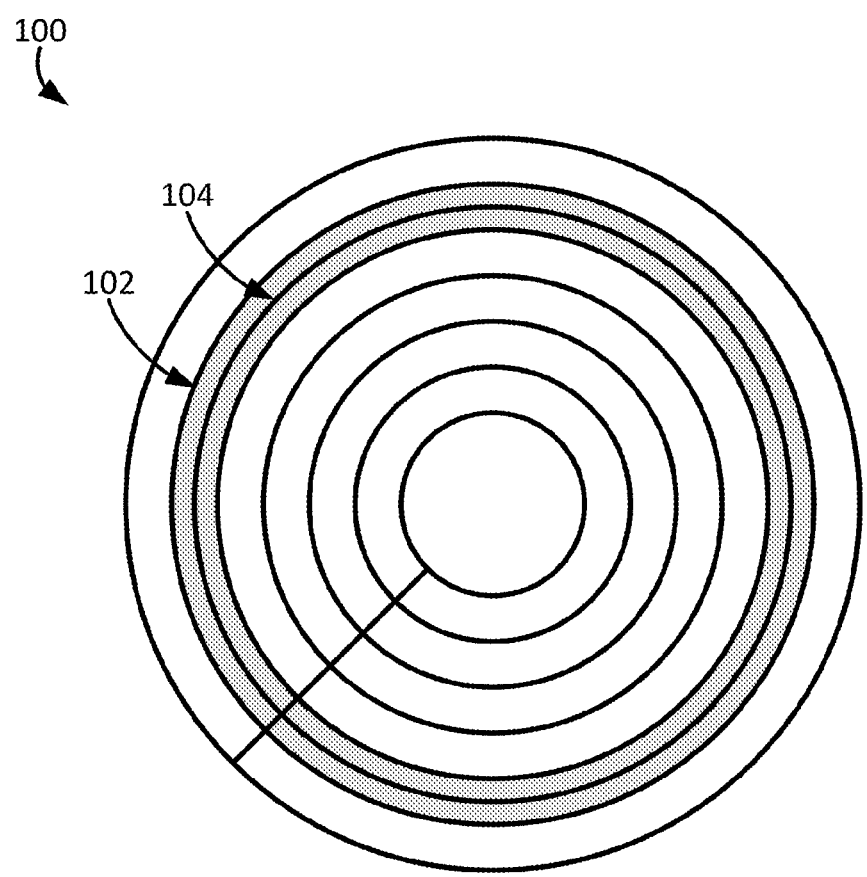
FIG. 4 is a diagram depicting one or more zones of a storage medium.

Thermal clearance compensation may be calculated for a plurality of zones for each storage medium (e.g., for each platter, disc, etc.) and for each head of a storage device. For example, a storage medium may be divided into a plurality of separate zones (e.g., each zone including portions of selected tracks, etc.), and each separate zone may contain different surface variations than each other. Thus, the thermal clearance compensation calculated for each zone may be different for each zone. An exemplary storage medium 100 including one or more zones 102, 104 is depicted in FIG. 4. Each of zones 102, 104 may be define as a concentric region extending around the storage medium 100 including multiple tracks. The exemplary systems, devices, and methods described herein may calculate, or generated, thermal clearance compensation for each of zones 102, 104 as well as the remainder of the zones of storage medium 100.

Since the exemplary thermal clearance compensation methods and processes described herein do not contact the head to the storage medium (e.g., space or spacing may exist between the head and the storage medium), the processes may be much quicker than calibration techniques that require contact or touchdown of the head to the storage medium. For example, an exemplary thermal clearance compensation method may be calibrated for 9 test zones on both temperature states, or conditions, in 8 minutes while previous contact calibration techniques (e.g., calibration techniques that require contact or touchdown) may take 60 minutes to calibrate 8 test zones in one of the two temperature states or conditions such as the low temperature state or condition. Thus, the exemplary non-contact thermal clearance compensation methods and processes may be able to significantly increase the test zones without increasing the time it takes to calibrate the storage device.

Additionally, each head may be different. In an exemplary storage device that includes multiple heads (e.g., one head for hear storage medium, multiple heads per storage medium, etc.), each head may have different thermal expansion/movement characteristics. Thus, the thermal clearance compensation calculated for each head may be different for each head.

Some embodiments may utilize different thermal clearance compensation based on the zone to be read or written to. Other embodiments may remove the outlier or anomalous calculated thermal clearance compensation, and then average the thermal clearance compensation across zones of a storage medium. For example, if a storage medium is divided into 23 zones and 23 different thermal clearance compensations are calculated, the 23 different thermal clearance compensations may be averaged (e.g., after removing the outliers and anomalous data) to provide an averaged thermal clearance compensation for the storage medium and/or head.

Exemplary systems, devices, and methods may additionally include a determination of whether the values (e.g., data signals) used to determine the thermal clearance compensation, and parameters thereof, should be used to determine thermal clearance compensation. For example, measurements may be considered flawed if the standard deviation over all the iterations is not expected. Further, for example, the thermal clearance compensation may only be allowable within an expected range. If the thermal clearance compensation is above the range, the maximum allowable compensation/correction may be used whereas if the thermal clearance compensation is below the minimum range, no correction may be needed. Also, the amount of decay in the thermal clearance compensation may be controlled by an upper and lower control limit.

The thermal clearance compensation may be evaluated to determine whether the thermal clearance compensation should be used in the device to compensate for any fly height variation or change of the head of the storage device due to temperature variation or change by comparing one or more values of the thermal clearance compensation to at least one threshold. For example, the standard deviation of fly height, or spacing, change (HIRP2) over the temperature range (e.g., from the high temperature condition to the low temperature condition), the maximum fly height thermal compensation value, and the decay value may be compared to threshold values to determine whether the calculated thermal clearance compensation or parts thereof may be used.

For example, if the maximum fly height thermal compensation value is less than an upper control limit and greater than a lower control limit, then the fly height thermal compensation may be allowable or acceptable. If, however, the maximum fly height thermal compensation value is greater than or equal to an upper control limit, then the fly height thermal compensation may be set to the upper control limit, and if the maximum fly height thermal compensation value is less than or equal to the lower control limit, then the fly height thermal compensation value may be set to zero.

As described, a decay value may also be compared to threshold values to determine whether the thermal clearance compensation or parts thereof may be used. For example, the decay value may be evaluated to determine whether it falls within upper and lower decay limits. If the decay value is less than an upper decay limit and greater than a lower decay limit, then the decay value may be allowable or acceptable. If, however, the decay value is greater than or equal to an upper decay limit, then the decay value may be set to the upper decay limit, and if the decay value is less than or equal to the lower decay limit, then the decay value may be set to the lower decay limit.

Fly height clearance compensation may be based on the sum of measured contact clearance (e.g., unchanging, known contact clearance) and thermal clearance compensation. A heater apparatus (e.g., a heating element that when increases in temperature, expands thereby moving a head closer to the storage medium surface) may apply clearance compensation to move the head closer to a target fly height.

Figure 5:
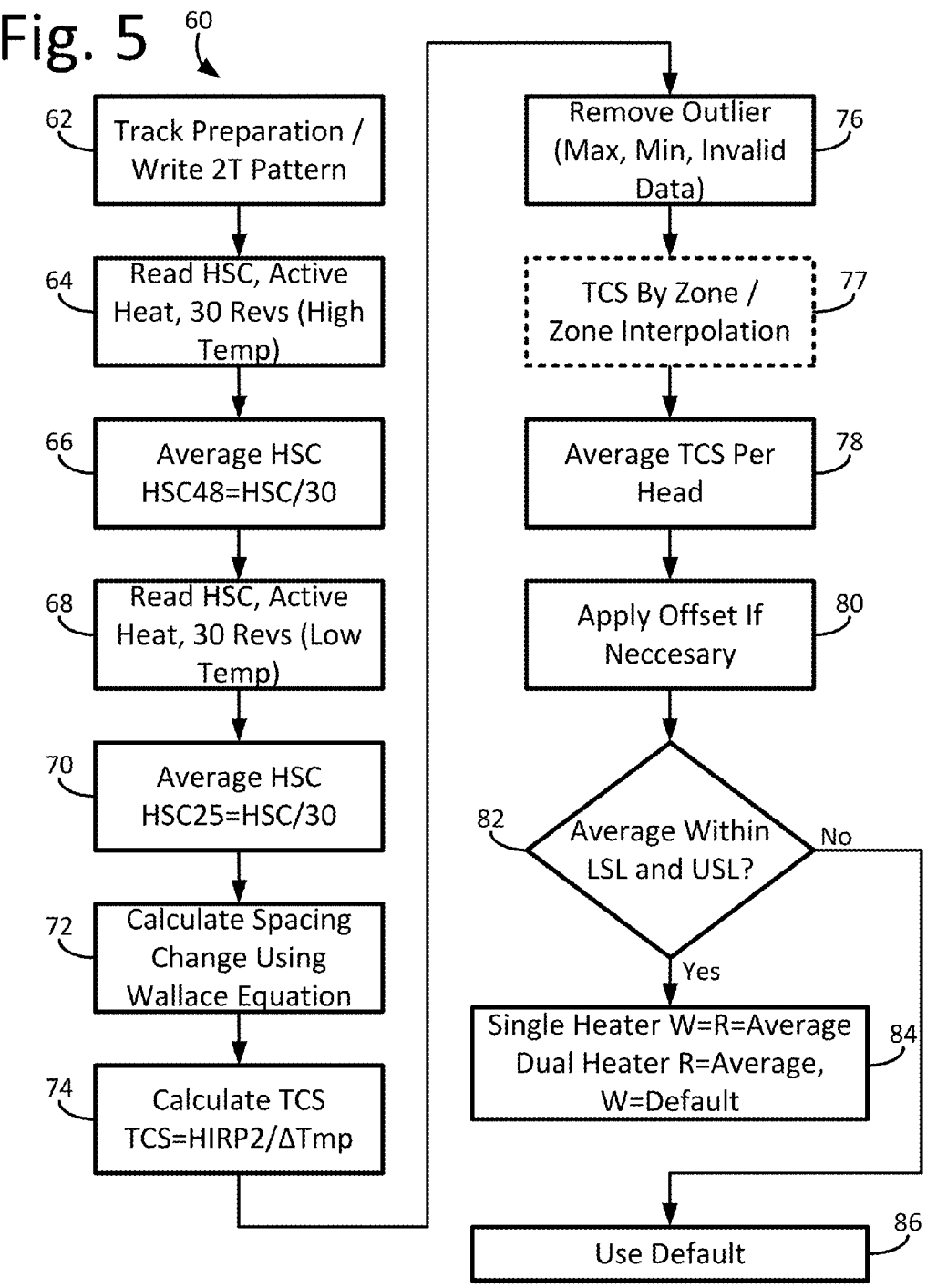
FIG. 5 is a flow diagram of a more detailed exemplary method of determining thermal clearance compensation for a storage device and applying thermal clearance compensation to storage device.

A more detailed exemplary method of determining thermal clearance compensation for a storage device and applying thermal clearance compensation to storage device without contact (e.g., no contact between the head and the storage medium, space or spacing may exist between the head and the storage medium, etc.) is depicted in FIG. 5. The method 60 may include track preparation 62 that include writing a selected pattern (e.g., 2T pattern) to at least one zone of a storage medium using a head. The method 60 may then read a signal from the zone having the selected pattern 64 using a harmonic sense controller in a high temperature condition. In this example, the high temperature condition may be 48 degrees Celsius. As exemplary method 60 is a non-contact thermal clearance compensation method, the selected pattern may be read 64 without contacting or burnishing the head to the storage medium (e.g., space or spacing may exist between the head and the storage medium). As shown, the pattern may be read for 30 revolutions (e.g., 30 senses) resulting in 30 signals, and the signals may be averaged over the 30 revolutions resulting in a single average high temperature data signal 66.

Next, the method 60 may proceed to reading a signal from the zone having the selected pattern 68 using a harmonic sense controller in a low temperature condition. In this example, the low temperature condition may be 25 degrees Celsius. As exemplary method 60 is a non-contact thermal clearance compensation method, the selected pattern may be read 68 without contacting or burnishing the head to the storage medium (e.g., space or spacing may exist between the head and the storage medium). As shown, the pattern may be read for 30 revolutions (e.g., 30 senses) resulting in 30 signals, and the signals may be averaged over the 30 revolutions resulting in a single average low temperature data signal 70.

The spacing change from the high temperature condition to the low temperature condition may be calculated using the Wallace Equation 72 (HIRP2=$(\lambda/2\pi)$*ln(HSC46/HSC25) where $\lambda$=(radius*$2\pi$*4*rotations per minute)/(60*f). For example, the amplitude of the 3rd harmonic of the high and low data signals may be converted to spacing, and the difference between the two may provide the spacing change. As described herein, the thermal clearance compensation may include a thermal clearance slope. The exemplary method 60 may calculate a thermal clearance slope (TCS) by dividing the calculated spacing by the changed in temperature 74.

The method 60 may additionally include a remove outlier step 76, in which maximum thermal compensation slope, minimum thermal compensation slope, and invalid data resulting in thermal compensation slopes are removed from plurality of thermal compensation slopes calculated.

Figure 6:
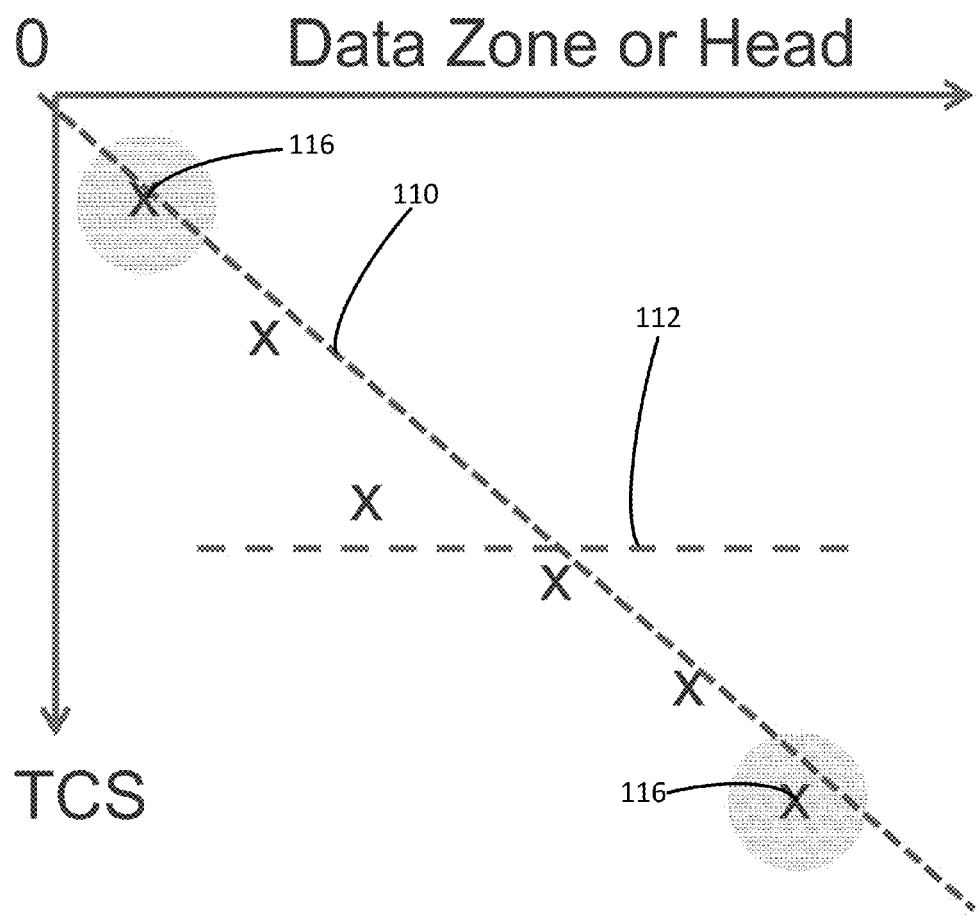
FIG. 6 is a chart depicting an exemplary outlier removal process.

Additionally, as described herein, thermal clearance compensation such as thermal clearance slope may be calculated for a plurality of zones on a storage medium. If the exemplary method 60 is calculating thermal clearance compensation for each zone, the method 60 may interpolate the zones 77 across the drive. For example, the thermal clearance slope (TCS) for different zones or heads, each marked with "X," is depicted in a graph of FIG. 6. As shown, the TCS values may be interpolated to form a line, or slope, 110 and/or averaged to form a line 112. The line 110 may be used to determine, or calculated the thermal clearance slope across zones or heads while the line 112 may simply represent the average thermal clearance slope to be used across zones or heads. Additionally, prior to any averaging or interpolation, the minimum TCS value 116 and/or maximum TCS value 118 may be removed from the data set.

Thus, in at least one embodiment, the thermal clearance compensation may be averaged for each head 78 over the plurality of zones that the head may read and write signals (e.g., data) from and to.

Figure 7:
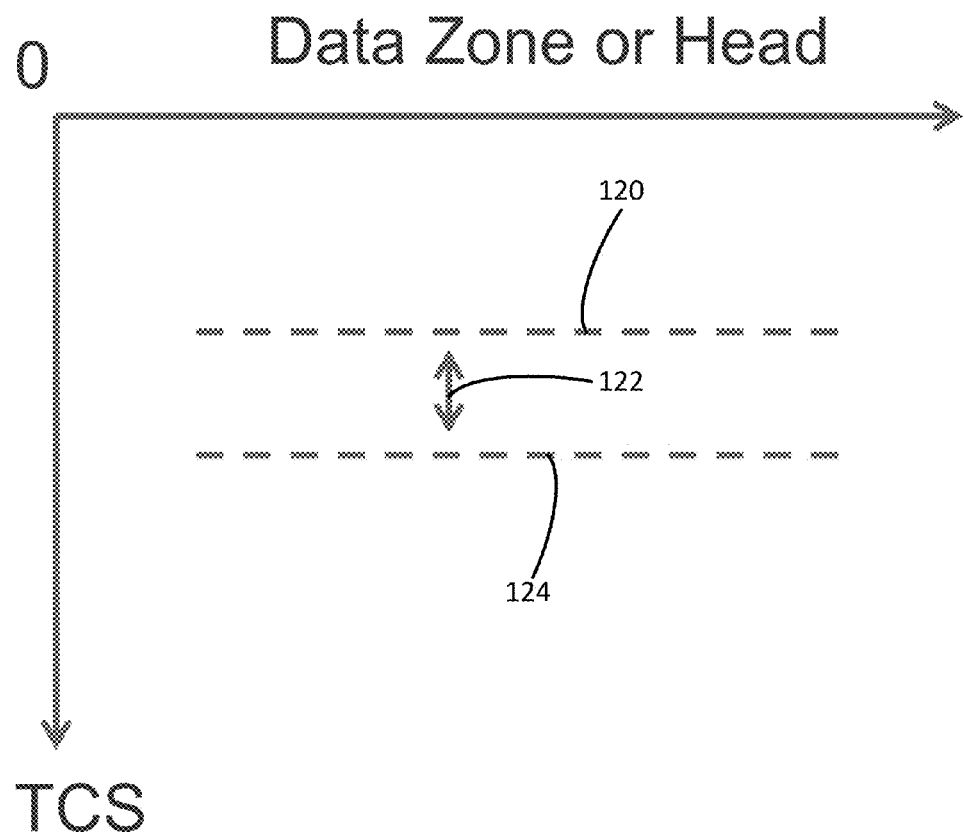
FIG. 7 is a chart depicting an exemplary offset process.

If necessary, an offset may be applied 80 to the thermal clearance compensation if the drive has special margins or requirements. For example, a negative offset may be applied that provides additional heat using a heater at lower temperatures and more backoff at higher temperatures, and hence, resulting in a better error rate at lower temperatures and better clearance margin at higher temperatures. Further, a positive offset may be applied that provides less heat using a heater at lower temperatures and less backoff at warmer temperatures resulting in better error rate at warmer temperatures and less clearance margin at lower temperatures. For example, an average thermal clearance slope 120 is depicted in a graph of FIG. 7 that may be either increased or decreased 122 by an offset if required. As shown, the average thermal clearance slope 120 is decreased to line 124.

Further, the thermal clearance compensation may be compared to limits to, e.g., determine if or what thermal clearance compensation may be used during operation. For example, if an averaged thermal clearance slope for a head is within a lower slope limit (LSL) and an upper slope limit (USL) 82, then the averaged thermal clearance slope may be utilized to compensate for changes in temperature in the storage device. In this example, a single heater may be used for writes and reads, and the heat (and therefore movement of the head) may be based on the averaged thermal clearance slope, or a dual heater may be used for writes and reads, and the heat (and therefore movement of the head) may be based on the averaged thermal clearance slope for only the reads while default heat may be used for writes (e.g., because writes may be less sensitive to fly height).

If an averaged thermal clearance slope for a head is not within the lower slope limit (LSL) and the upper slope limit (USL) 82, then the default clearance values may be utilized by the heater for reads and writes 86.

Figure 8:
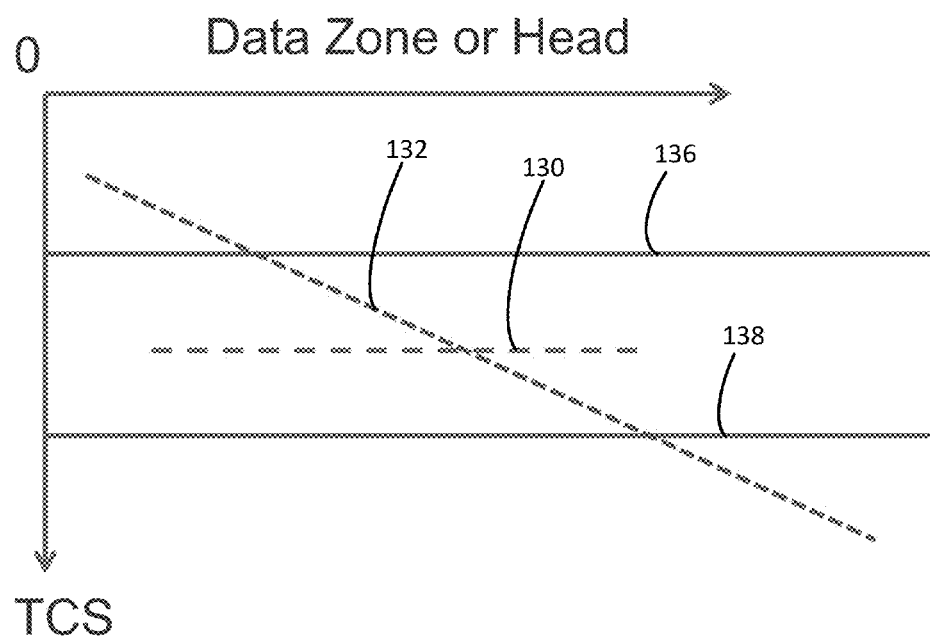
FIG. 8 is a chart depicting an exemplary limit process.

For example, an average thermal clearance slope 130 and thermal clearance slope 132 is depicted in the graph of FIG. 8. As shown, the TCS values may be outside of the upper slope limit 136 and the lower slope limit 138 may be may be removed and/or set to the upper slope limit 136 and lower slope limit 138, whichever the value is closer to.

A chart comparing exemplary non-contact thermal clearance compensation calibration (NC Process) with contact thermal clearance compensation calibration (C Process) is shown in FIG. 9. To compare the exemplary non-contact thermal clearance compensation calibration with contact thermal clearance compensation calibration, the bit error rates (BER) and differences therebetween are depicted in the chart for two different head gimbal assemblies A and B. The Delta A is a BER comparison between the BER at the high temperature condition (e.g., 46 degrees Celsius) without thermal clearance compensation and the BER at the low temperature condition (e.g., 25 degrees Celsius) without thermal clearance calibration. The Delta C is a BER comparison between the BER at the high temperature condition (e.g., 46 degrees Celsius) without thermal clearance compensation and the BER at the low temperature condition (e.g., 25 degrees Celsius) with thermal clearance calibration. As shown, the exemplary non-contact processes show similar improvement of BER as the contact processes for both head gimbal assemblies.

The methods, techniques, and/or processes described in this disclosure, including those attributed to the processor, or various constituent components, may be implemented, at least in part, in hardware, software, firmware, or any combination thereof. For example, various aspects of the techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g., 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

Exemplary methods and devices were described herein with reference to FIGS. 1-9. It will be apparent to one skilled in the art that elements or processes from one embodiment may be used in combination with elements or processes of the other embodiments, and that the possible embodiments of such methods and devices using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

What is claimed is:

1. A system comprising: a computing apparatus configured to be coupled to one or more storage devices, each storage device comprising a storage medium and a head configured to write and read data from the storage medium, the computing apparatus configured to perform a fly height calibration without contacting the head to the storage medium during testing and calibration of the storage device prior to and not when using thermal clearance compensation to compensate for fly height change during different temperature conditions, and to perform the fly height calibration, the computing apparatus is further configured to: write a selected pattern to the storage medium using the head of at least one storage device; read the selected pattern from the storage medium using the head without contacting the head to the storage medium during a high temperature condition resulting in high temperature signal data; read the selected pattern from the storage medium using the head without contacting the head to the storage medium during a low temperature condition resulting in low temperature signal data; and calculate thermal clearance compensation for the head based on the high and low temperature signal data, the thermal clearance compensation configured to compensate for fly height change of the head during different temperature conditions.

2. The system of claim 1, wherein the thermal clearance compensation comprises a thermal clearance slope, wherein the thermal clearance slope is a spacing change of the head divided by change in temperature between the high temperature condition and the low temperature condition.

3. The system of claim 1, wherein the computing apparatus is further configured to convert a harmonic amplitude change between the high temperature signal data and the low temperature signal data to a spacing change.

4. The system of claim 1, wherein the high temperature signal data comprises an average harmonic amplitude of a plurality of high temperature signals, each of the plurality of high temperature signals resulting from the read selected pattern, and wherein the low temperature signal data comprises an average harmonic amplitude of a plurality of low temperature signals, each of the plurality of low temperature signals resulting from the read selected pattern.

5. The system of claim 1, wherein each storage device comprises a plurality of heads and thermal clearance compensation is calculated for each of the plurality of heads.

6. The system of claim 5, wherein the computing apparatus is further configured to calculate an average thermal clearance compensation for the storage medium using the thermal clearance compensation calculated for each of the plurality of heads.

7. The system of claim 1, wherein each storage device comprises a plurality of zones and thermal clearance compensation is calculated for each of the plurality of zones.

8. The system of claim 7, wherein the computing apparatus is further configured to calculate an average thermal clearance compensation for the storage medium using the thermal clearance compensation calculated for each of the plurality of zones.

9. The system of claim 1, wherein the computing apparatus is further configured to compare at least a portion of the thermal clearance compensation to at least one threshold to determine whether the thermal clearance compensation should be used in the device.

10. A method comprising: providing a storage device comprising a storage medium and a head associated with the storage medium; and performing a non-contact fly height calibration without contacting the head to the storage medium during testing and calibration of the storage device prior to and not when using the thermal clearance compensation to compensate for fly height change during different temperature conditions and performing the non-contact fly height calibration comprises: writing a selected pattern to the storage medium using the head; reading the selected pattern from the storage medium using the head without contacting the head to the storage medium during a high temperature condition resulting in high temperature signal data; reading the selected pattern from the storage medium using the head without contacting the head to the storage medium during a low temperature condition resulting in low temperature signal data; and calculating thermal clearance compensation for the head based on the high and low temperature signal data, the thermal clearance compensation configured to compensate for fly height changes of the head.

11. The method of claim 10, wherein the thermal clearance compensation comprises a thermal clearance slope, wherein the thermal clearance slope is a spacing change of the head divided by change in temperature between the high temperature condition and the low temperature condition.

12. The method of claim 10, wherein the method further comprises converting a harmonic amplitude change between the high temperature signal data and the low temperature signal data to a spacing change.

13. The method of claim 10, wherein the high temperature signal data comprises an average harmonic amplitude of a plurality of high temperature signals, each of the plurality of high temperature signals resulting from the read selected pattern, and wherein the low temperature signal data comprises an average harmonic amplitude of a plurality of low temperature signals, each of the plurality of low temperature signals resulting from the read selected pattern.

14. The method of claim 10, wherein the storage device comprises a plurality of heads and thermal clearance compensation is calculated for each of the plurality of heads.

15. The method of claim 10, wherein the storage device comprises a plurality of zones and thermal clearance compensation is calculated for each of the plurality of zones.

16. The method of claim 10, wherein the method further comprises comparing at least a portion of the thermal clearance compensation to at least one threshold to determine whether the thermal clearance compensation should be used in the device.

17. A storage device comprising:
a storage medium and a head configured to write data to and read data from the storage medium; and
a processor operably coupled to the head and configured to compensate for fly height change during different temperature conditions based on thermal clearance compensation, wherein the thermal clearance compensation is calculated without contacting the head to the storage medium during a non-contact fly height calibration and testing of the storage device prior to and not when using the thermal clearance compensation to compensate for fly height change during different temperature conditions.

18. The device of claim 17, wherein the processor comprises a harmonic sensor controller used to calculate the thermal clearance compensation without contacting the head to the storage medium.

* * * * *